United States Patent [19]

Majoie

[11] 3,714,197
[45] Jan. 30, 1973

[54] PROCESS FOR THE PREPARATION OF 2,3-DIBROMFURAN

[75] Inventor: Bernard Majoie, Dijon, France

[73] Assignee: Societe De Recherches Industrielles S.O.R.I., Dijon, France

[22] Filed: June 22, 1970

[21] Appl. No.: 48,460

[30] Foreign Application Priority Data

June 23, 1969  France..................................6920892

[52] U.S. Cl. ..........................260/346.1 R, 260/347.5
[51] Int. Cl. ................................................C07d 5/18
[58] Field of Search ..............................260/346.1 R

[56] References Cited

OTHER PUBLICATIONS

Dunlop et al., The Furans, Reinhold Publishing Co., New York, (1953) pages 83, 84, 106–112, 388 and 510.

Nazarova et al., Zhur. Obschel Khim., Vol. 19, p. 777–780 (1949).

Chemical Abstract (provided) Vol. 44, page 1092–1093 (1950).

*Primary Examiner*—Alex Mazel
*Assistant Examiner*—Bernard Dentz
*Attorney*—John Lezdey

[57]  ABSTRACT

The invention relates to a process for the preparation of 2,3-dibromofuran by brominating an alkyl furoate, suitably methyl or ethyl furoate, in the presence of a chlorinated organic solvent; saponifying the brominated ester; decarboxylating the saponified ester and recovering the 2,3-dibromofuran. The furoate ester is conveniently prepared by oxidizing furfural with potassium permanganate, preferably in the presence of acetone as solvent, and reacting the furoic acid so formed with methyl or ethyl alcohol, suitably in the presence of sulphuric acid.

4 Claims, No Drawings

PROCESS FOR THE PREPARATION OF 2,3-DIBROMFURAN

The present invention is concerned with improvements in and relating to the preparation of 2,3-dibromofuran.

It has been proposed to prepare dibromofurans by the bromination of furoic acid. However, this process leads to the formation of mixtures of brominated addition derivatives, which are selectively dehydrohalogenated, and then separated to give 4,5-dibromofuroic acid, with yields as low as 2 to 5 percent.

It has now been found, in accordance with the invention, that the yield of brominated derivative may be improved by brominating an ester of furoic acid followed by decarboxylation thereof. In accordance with the invention the brominated derivatives are obtained by a substitution reaction as opposed to an addition reaction.

According to the invention, therefore, there is provided a process for the preparation of 2,3-dibromofuran which comprises brominating an ester of furoic acid, suitably an alkyl ester of furoic acid and preferably ethyl or methyl furoate, and subsequently decarboxylating the brominated ester.

The bromination of the furoic acid ester is suitably carried out by contacting the ester with bromine in the presence of an anhydrous chlorinated organic solvent such as chloroform, carbon tetrachloride, or 1,1,2,2-tetrachloroethane.

The bromination leads to a mixture of 4,5-dibromo-2-furoate, 5-bromo-2-furoate with traces of 3,4,5-tribromo-2-furoate, the molar ratio of the 4,5-dibromo derivative to the 5-bromo derivative being about 9/1. It is possible to separate the mixture of brominated furoates at this point but it is preferred to carry out the decarboxylation of the whole mixture and subsequently separate out the 2,3-dibromofuran by distillation while also recovering 2-bromo- and 2,3,4-tribromofuran.

The carboxylation of the brominated furoic acid esters is suitably carried out in two stages, namely a saponification, suitably with an alkaline solution such as 4N sodium hydroxide solution, followed by decarboxylation of the saponified ester preferably in the presence of upper powder as catalyst and quinoline as solvent, the decarboxylation reaction being carried out at elevated temperatures, e.g. a temperature about 180°C.

As stated above it is preferred to use the methyl or ethyl esters of furoic acid as starting materials in the process of the invention. The esters may be prepared by esterifying furoic acid with methyl or ethyl alcohol under reflux for 6 to 8 hours and in the presence of sulphuric acid. The furoic acid is most conveniently prepared by the oxidation of furfural with potassium permanganate in the presence of water or, preferably acetone. Furfural is a readily available inexpensive starting material.

A preferred process in accordance with the invention thus comprises:

a. Oxidizing furfural to furoic acid with potassium permanganate;

b. Esterifying furoic acid with ethyl or methyl alcohol;

c. Brominating the furoic acid ester with bromine in a chlorinated organic solvent at reflux temperature;

d. Saponifying the mixture of brominated furoates with 4N sodium hydroxide solution; and e. decarboxylating the saponified esters and separating out the 2,3-dirbomofuran by distillation under reduced pressure.

EXAMPLE 1

Preparation of 2,3-dibromofuran from furoic acid a. Preparation of methyl furoate 400 Grams of furoic acid, 750 cc of methyl alcohol and 35 cc of concentrated sulphuric acid are placed in a one-necked flask.

The mixture is maintained at reflux for 6 to 8 hours; the excess alcohol is distilled off under reduced pressure; the residue is taken up in ether, neutralized with an aqueous solution containing 100 g/l NacCO$_3$ and then washed with water until the ethereal phase is neutral.

The ethereal phase is dried over magnesium sulphate and decolorized with animal charcoal. The rest of the solvent is then distilled off under reduced pressure and the residue distilled.

The ester is obtained in a minimum yield of 80 percent, and this has been found to be the case for esters other than the methyl ester, the ethyl ester in particular. In the case of methyl furoate, 380 grams of ester are collected by distillation at 74°C at 15 mm of mercury. This represents a yield of 85 percent.

b. Preparation of methyl 4,5-dibromo-2-furoate

One mole (126 grams) of ester dissolved in 250 cc of carbon tetrachloride, previously dried over magnesium sulphate, are placed in a reactor.

The solution is maintained at reflux and there are added thereto dropwise 3 moles of bromine which have been dried over sulphuric acid and calcium bromide; the excess of bromine (1 mole) being intended to compensate for the losses due to the formation of hydrobromic acid which is formed quickly during the initial stages of the reaction. The bromination is carried out with constant stirring and the reaction mixture is maintained at reflux until the formation of hydrobromic acid ceases.

At the end of the reaction, the solution is cooled and there is the added carbon tetrachloride in an amount of 10 percent by volume with respect to the volume of the reaction mixture. Nitrogen is then bubbled through the reaction mixture to remove excess bromine and dissolved hydrobromic acid.

The contents of the reactor are then discharged into a neutralizing solution; i.e. 100 cc of an aqueous solution of 100 g/l of sodium carbonate maintained at a temperature in the region of 0°C.

The organic phase is separated and is washed with successive lots of sodium carbonate solution containing 100 g/l sodium carbonate. The p/H of the organic is then adjusted to about 5 by washing with water. The organic phase is dried, then passed over animal charcoal before evaporation under reduced pressure.

There is obtained as residue an oil which solidifies in a refrigerator and which contains a mixture of 4,5-dibromo and methyl 5-bromo-furoate in a molar ratio of 9:1 together with traces of methyl 3,4,5-tribromo-2-furoate.

c. Saponification of the mono and dibrominated esters 1200 cc of a 4N sodium hydroxide solution are heated to 50°C, the oil obtained in (b) above is added thereto by means of a bromine funnel. During the course of the addition the temperature is raised to between 60° and 65°C and maintained at this level for 8 hours.

The water-insoluble sodium salts precipitate slowly. By agitation with increasing speed a complete saponification is obtained.

After cooling the mixture while stirring, 2,000 cc of ether are added thereto and then the reaction medium is acidified with a mixture of about 450 cc of concentrated hydrochloric acid and about 450 grams of ice. The solution of HCl is rapidly dropped into the reaction mixture and the mixture is stirred until the contents of the flask contain no solid. The organic acid passes into the ethereal phase.

The contents of the reactor are decanted; the ethereal phase is separated and the aqueous phase is extracted successively by washing with ether. The ethereal phases are combined successively by washing with ether. The ethereal phases are combined and then washed with water. After drying and passing over charcoal, the solvent is evaporated off and the organic acid precipitates.

The precipitate obtained contains a mixture of 4,5-bromo and 5-bromo-furoic acids in a molar ratio of 9:1 together with traces of bromo-furoic acid.

The yield in steps (b) and (c) is 80 percent with respect to the amount of methyl furoate.

d. Decarboxylation of the acid mixture

The decarboxylation is carried by heating the following mixture on an oil bath at 180°C:

330 grams of the mixture of acids obtained in (c) above
1,300 cc quinoline
130 grams copper powder.

The decarboxylation is carried out in a three-necked flask. By maintaining the temperature of the reaction mixture at 180°C for about half an hour, the evolution of $CO_2$ progressively reduces.

It is then convenient to replace the oil bath by a path of cold water until the reaction mixture reaches a temperature between 30° and 40°C. The contents of the flask are then discharged into 2,300 cc of HCl diluted to one-half at 0°C.

After agitation and verification of the existence of an acid pH, 2,000 cc ether are added to the acid mixture which is filtered to remove the copper.

The ethereal phase is then separated from the aqueous phase and the latter is extracted by successive washings with ether. The combined ethereal phases are then washed with water, dried and passed over charcoal.

The solvent is evaporated off under reduced pressure to give a mixture of 2-bromofuran and 2,3-dibromofuran. In view of the relatively lower boiling point of 2-bromofuran, the latter which forms 10 mole percent of the mixture of the two products, is eliminated in the course of distillation. The 2,3-bromofuran is collected by distillation at 58°C under a pressure of 15 mm of mercury to give 220 grams of 2,3-dibromofuran, which corresponds well to the molar proportion of 90 percent of the mixture of the two acids and of their starting esters.

The total yield from step (b), (c) and (d) is 70 percent with respect to the starting methyl furoate.

EXAMPLE 2

Oxidation of furfural

The conventional method is used; the oxidation being carried out in water in the presence of potassium permanganate to give an aqueous solution of the potassium furoate. The manganese oxide ($MnO_2$) is filtered off and the reaction mixture is acidified with hydrochloric acid diluted to one-half. The addition of this acid causes the precipitation of furoic acid in a yield of about 70 percent.

Following the same procedure, furfural is oxidized with potassium permanganate but using acetone as solvent instead of water.

After the oxidation with $KMnO_4$, $MnO_2$ precipitates and is filtered off. The acetone is evaporated off and dry potassium furoate is obtained. The salt is redissolved in warm water and then, by the addition of hydrochloric acid diluted to one-half, the free acid is precipitated in a yield of 85 percent.

In addition to the increase in yield, another advantage of the oxidation in acetone is that operation under these conditions permits four to five times more furfural to be treated. Thus, a considerable concentration of furfural in the acetone is not an obstacle to the reaction in contradistinction to the case when using an aqueous medium. Moreover, acetone also permits the use of a higher concentration of potassium permanganate.

Further, esterification in accordance with the procedure of Example 1(a) using furoic acid prepared from furfural by oxidation in acetone has led to yields of 95 percent of the methyl and ethyl furoates.

The yield obtained by the direct bromination of furfural was compared with that obtained by the bromination of the intermediate furoate. The direct bromination of furfural followed by the oxidation of the aldehyde group to a carboxyl group gives a yield of 4,5-dibromofuroic acid of 25 percent.

On the other hand, in the bromination of the ester obtained starting from furfural, there is obtained a total yield based on furfural of 55 to 60 percent of 2,3-dibromofuran.

EXAMPLE 3

Preparation of mono, di and tribromofurans a. Bromination of methyl furoate

In a 1,000 cm³ reactor equipped with an agitator, a refrigerating apparatus and a bromine funnel, 126 grams (1 mole) of methyl furoate dissolved in 250 cc of chloroform are heated to reflux. 133 cc (2.5 moles) of bromine are added to the mixture at a rate of 20 cc per hour and the mixture is maintained under reflux for 350 hours. The evolution of hydrobromic acid is very rapid at the start of the reaction. But gradually reduces and is practically nil at the end of the reaction.

The reaction mixture is allowed to cool to ambient temperature and nitrogen is bubbled therethrough to remove the major part of bromine and hydrobromic acid remaining in solution. The contents of the reactor are then discharged into 1,000 cc of a solution of sodium carbonate containing 100 g/l of sodium carbonate, cooled to 0°C. The aqueous phase is extracted twice with 500 cc of chloroform and the combined organic phases are washed five or six times with a solution of sodium carbonate containing 100 g/l of sodium carbonate and then with water until the solution is neutral. After drying and decolorization on charcoal the solvent is evaporated off under reduced pressure. A mixture of mono, di and tribrominated esters is isolated in the form of an orange oil which partially crystallizes in the refrigerating apparatus.

b. Saponification of the mixture of brominated esters 1,200 cc of a 4N soda solution are introduced into a 5000 cc reactor equipped with an efficient agitator and heated to 50°C. The oil obtained in (a) above is slowly added to the soda solution. After an hour the water-insoluble sodium salts of the acids start to precipitate. The temperature of the mixture is then raised to 60°–65 °C and maintained at this level for five hours. The mixture is then allowed to cool to ambient temperature and 2,000 cc ether are added thereto; and the reaction mixture is then acidified with a solution obtained from 450 cc of concentrated hydrochloric acid and 600 grams of ice; this solution being maintained at −20°C. The aqueous phase is extracted three times with 300 cc ether. The combined ethereal phases are washed with water until a pH of 4 is attained, dried and decolorized. After evaporating off the solvent, 260 grams of a mixture of mono-, di- and tribrominated acids is isolated.

c. Decarboxylation of the mixture of brominated acids

260 Grams of the mixture of acids obtained in (b) above, 1,000 cc quinoline and 100 grams of copper powder are introduced into 2,000 cc three-necked flask.

An oil bath is preheated to 180°C and when this temperature is reached the flask is quickly plunged therein and decarboxylation starts immediately. The temperature is maintained at 180°C. As soon as the evolution of carbon dioxide gas slows down, the oil bath is withdrawn and rapid cooling is effected. When the reaction mixture has reached a temperature of 30°–40 °C, it is discharged into 2000 cc of 5N hydrochloric acid maintained at 0°C. 1500 cc of ether are added to the acidified mixture and the ethereal phase is decanted off and the aqueous phase is extracted twice with 400 cc ether. The ethereal phase is neutralized and the ether evaporated off under reduced pressure in vacuo. The residue is distilled to give 10 grams of 2-bromofuran ($Eb_{30}$: 34°C, $Eb_{750}$:101°$BC$), 150 grams of 2,3-dibromofuran ($Eb_{30}$:$Eb_{20}$:65°C) and 4 grams of a fraction which distills between 102° and 108°C at 15 mm. On vapor phase chromatograph of this fraction (column temperature 155°C, time of retention 735 s, helium rate: 70 cm³/mn) there is obtained 2,3,4-tribromofuran (m.p. 31°C).

EXAMPLE 4

Use of the 2,3-dibromofuran for the synthesis of 3-bromofuran

One mole of methyl lithium is suspended in ether at −70°C with agitation in a three-necked flask. There is then added dropwise 1.02 mole (230 grams) of 2,3-dibromofuran dissolved in 400 cc of anhydrous ether. The reaction mixture is then discharged into iced water.

After extraction with ether, drying of the ethereal phase and evaporating off the solvent, the product obtained is distilled at atmospheric pressure at 100°C to give 112 grams of 3-bromofuran (yield: 76 percent with respect to the starting 2,3-dibromofuran).

The products obtained in accordance with the invention can be used for the preparation of various mono or disubstituted derivatives of furan.

I claim:

1. A process for the preparation of 2,3-dibromofuran which comprises the steps of brominating by the addition of an excess amount of bromine to an alkyl ester of less than three carbon atoms of furoic acid in a chlorinated organic solvent; saponifying the ester; decarboxylating the brominated acid formed; and then recovering 2,3-dibromofuran.

2. A process according to claim 1 wherein the ester of furoic acid is obtained by oxidizing furfural to furoic acid with potassium permanganate and reacting the furoic acid with methyl alcohol or ethyl alcohol.

3. A process for the preparation of 2,3-dibromofuran which comprises the stages of:
   a. oxidizing furfural to furoic acid with potassium permanganate;
   b. esterifying the furoic acid with an alkanol selected from the group consisting of methanol or ethanol;
   c. brominating the furoate formed by the addition of an excess amount of bromine in a chlorinated organic solvent selected from the group consisting of chloroform, carbon tetrachloride and tetrachloroethane at the reflux temperature of the said solvent;
   d. saponifying the mixture of the 5-bromo, 4,5-dibromo and 3,4,5 tribromo-2 furoates formed;
   e. decarboxylating the mixture of 5-bromo, 4,5-dibromo and 3,4,5-tribromo furoic acids formed; and then
   f. recovering the 2,3-dibromofuran by distillation under reduced pressure.

4. A process according to claim 3 wherein the saponification is effected with 4N sodium hydroxide solution at a temperature between 60° and 65°C for about 8 hours.

* * * * *